United States Patent
Harple et al.

(10) Patent No.: US 8,743,224 B2
(45) Date of Patent: Jun. 3, 2014

(54) CONTEXT BASED MANAGEMENT FOR SECURE AUGMENTED REALITY APPLICATIONS

(75) Inventors: Todd Harple, Hillsboro, OR (US); Gyan Prakash, Beaverton, OR (US); Saurabh Dadu, Tigard, OR (US); Sigal Louchheim, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 54 days.

(21) Appl. No.: 13/549,122

(22) Filed: Jul. 13, 2012

(65) Prior Publication Data
US 2014/0015987 A1      Jan. 16, 2014

(51) Int. Cl.
*H04N 5/232*  (2006.01)

(52) U.S. Cl.
USPC .................................... 348/211.3; 348/222.1

(58) Field of Classification Search
USPC .................... 348/211.1–211.3, 211.14, 222.1
See application file for complete search history.

(56) References Cited

U.S. PATENT DOCUMENTS

| | | | |
|---|---|---|---|
| 7,423,667 B2 * | 9/2008 | Hayasaka | 348/143 |
| 2008/0055408 A1 * | 3/2008 | Wun | 348/122 |
| 2009/0181716 A1 * | 7/2009 | Benco et al. | 455/550.1 |
| 2013/0013932 A1 * | 1/2013 | Kong et al. | 713/189 |

* cited by examiner

*Primary Examiner* — Gevell Selby
(74) *Attorney, Agent, or Firm* — Schwegman, Lundberg & Woessner, P.A.

(57) ABSTRACT

An example system that allows a camera enabled application, such as an augmented reality application, to run in a protected area may include a first device including a camera, the camera including a secure mode of operation and a display, an image processing module configured to convert image data from the camera to encoded data when the camera is in the secure mode and protect image data stored in the system, an encryption module configured to encrypt encoded data from the image processing module, and a protected audiovisual path mechanism configured to securely send augmented encoded data to the display.

25 Claims, 5 Drawing Sheets

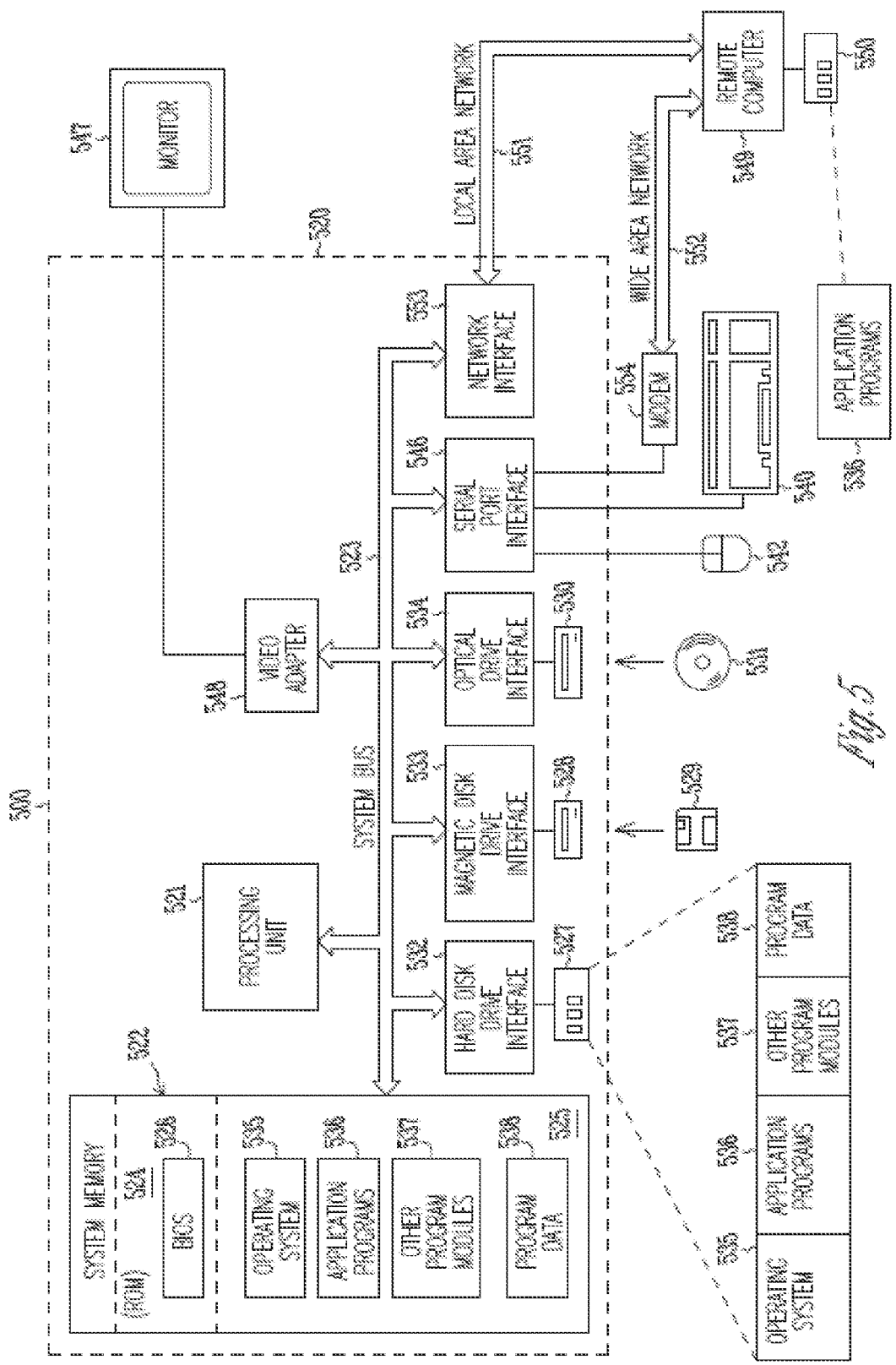

CONTEXT BASED MANAGEMENT FOR SECURE AUGMENTED REALITY APPLICATIONS

TECHNICAL FIELD

This disclosure relates generally to the use of augmented reality applications in areas where cameras may not be desired.

BACKGROUND ART

Places that contain proprietary information such as manufacturing facilities or enterprise premises may discourage or ban the use of cameras. Cameras that are included in a telephone such as a Smartphone may be turned off to help accomplish this task. By turning off the camera on the telephone or other device, a camera enabled application such as an augmented reality application, may not be used.

BRIEF DESCRIPTION OF THE DRAWINGS

FIG. 5 is a block diagram of a computer system to implement methods, according to an example embodiment.

DESCRIPTION OF THE EMBODIMENTS

Figure 1:
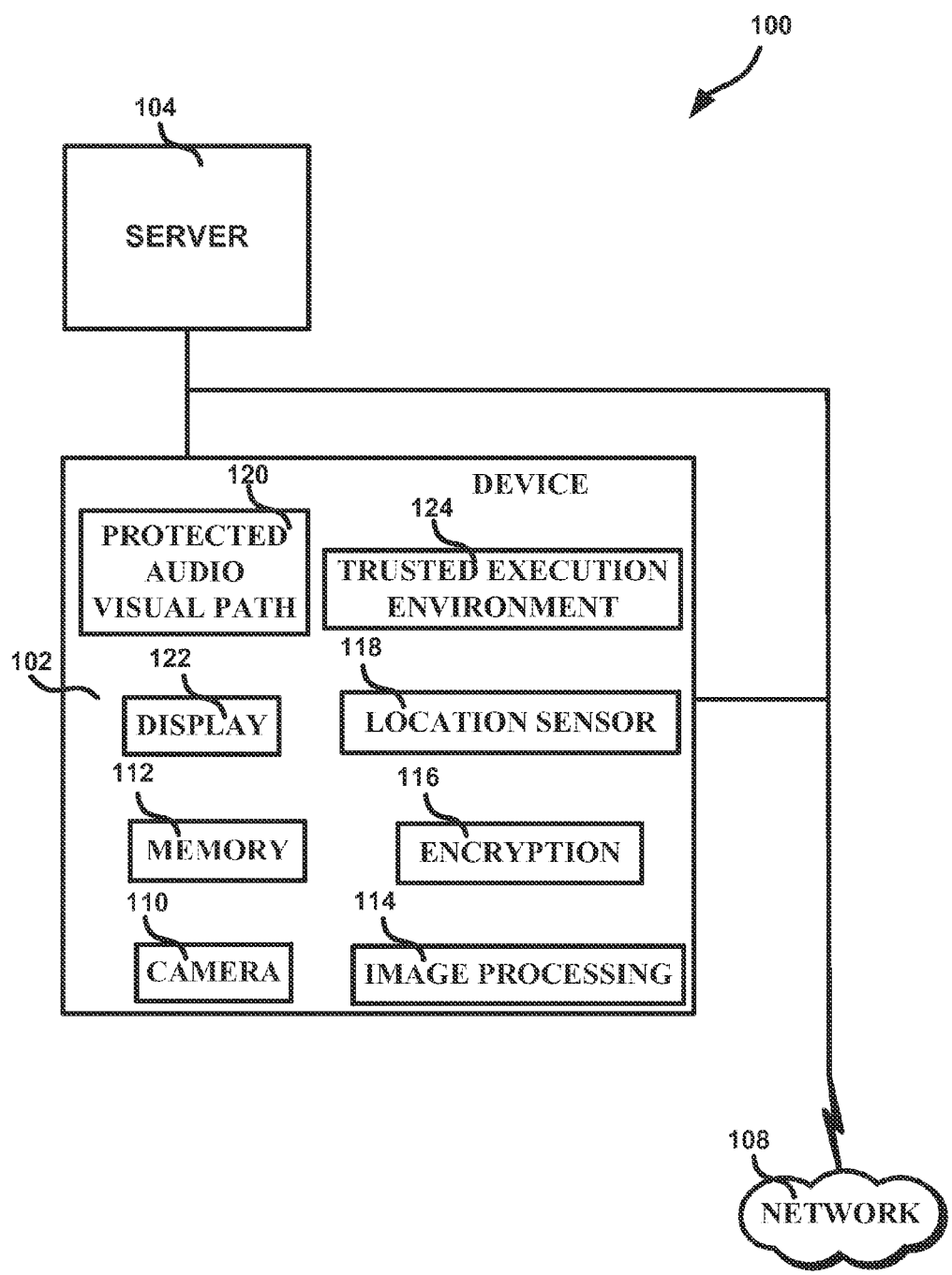
FIG. 1 is a logical block diagram of a system, according to an example embodiment.

The following description and the drawings illustrate specific embodiments to enable those skilled in the art to practice them. Other embodiments may incorporate structural, logical, electrical, process, or other changes. Portions and features of some embodiments may be included in, or substituted for those of other embodiments. Embodiments set forth in the claims encompass all available equivalents of those claims.

Turning a camera or other device including a camera, off when it is in a protected (e.g. secure) area will prevent augmented reality and other camera-enabled applications from being fully operable. In many situations, this will impede the usefulness of an augmented reality or other camera-enabled application. The present application provides embodiments that allow cameras and devices including a camera to remain on, such as by protecting images that the camera takes so that the images may not be accessed without proper authentication or authorization. Note that as used herein, unless stated otherwise, the term camera refers to a camera and also other devices including a camera, such as a mobile telephone, tablet computer, a laptop computer, or other computing device that includes a camera.

Augmented reality (AR) applications provide a view of a real-world environment augmented by computer-generated sensory input such as sound, video, graphics, or GPS (Global Positioning System) data. Augmented reality applications may be useful in helping maintenance personnel fix equipment in a protected area, for example. If a user points the camera to a piece of equipment, an AR application may be able to identify the piece of equipment and overlay it with graphical information showing what different parts are, how to open the panels, which screw to take off first, and so on.

Some example embodiments include allowing an augmented reality application to function in a protected area while the camera remains on by protecting images captured by the camera, sending the protected images to a server to be augmented, receiving the augmented images from the server, and protecting the augmented images through a protected audio visual path (PAVP). In some embodiments, the images may be protected by preventing the images from being saved in the clear in a memory of the camera or installed or otherwise accessible by the camera. In some embodiments, the images may be protected by encrypting the image data before it is saved to a memory. The protected audio visual path may be operable to allow only hardware associated with a display device to decrypt the data representative of the augmented images.

An advantage of one or more embodiments may include allowing an augmented reality application, or other camera enabled application to be executed on a device even when the device is near a protected area. For example, an augmented reality application may be allowed to operate and aid a person in fixing equipment located where a camera may not typically be permitted. The augmented reality application may be operable to provide information about objects in the image displayed on a screen coupled to the camera.

FIG. 1 is a logical block diagram of a system 100, according to an example embodiment. The system 100 may include a device 102 and a server 104 connected to a network 108. The network 108 may include one or more wired and wireless networks such as a Local Area Network, the Internet, a virtual private network, and other such networks.

There may be a pre-established trust relationship between the device hardware (e.g. a trusted execution environment (TEE) or a protected audio visual path (PAVP)). The device hardware may securely exchange the encryption or decryption keys so that the server may know such as through communicating with a TEE how to decrypt the data transmitted from the device with the camera and PAVP knows how to decrypt the data that was encrypted by the server.

The device 102 may include a secure camera mode which protects image data captured by a camera 110 when the camera 110 is in the secure camera mode. The secure camera mode may be activated or implemented through firmware, source code, hardware, or a combination thereof. In some embodiments, the firmware, source code, or hardware associated with camera 110 may be altered to at least partially implement the secure camera mode. In some embodiments, a data path of the camera 110 may be modified so as to protect data produced by the camera 110. In some embodiments, modifying the data path of the camera may include modifying the source code, firmware, or hardware associated with the camera, or a combination thereof to change the path of the data. In some embodiments, the data produced by the camera 110 may be sent to an image processing module 114 (e.g. an image signal processing module) to be encoded. Encoding data may include modifying the data to be a renderable image or video data. In some embodiments, the image processing module 114 modifies the data received from the camera 110 into a form compatible with display 122. In some embodiments, after the data is encoded the encoded data may be sent to an encryption module such as encryption module 116 to be encrypted. In other embodiments, after the data is encoded the encoded data may be sent to a trusted execution environment such as trusted execution environment 124.

Device 102 may be a tablet, portable digital assistant (PDA), Smartphone, computer, camera, or other device. The device 102 may include a camera 110. The camera 110 may be operable to capture data representative of an image (e.g. a moving or still image) and send the data to an image processing module 114, encryption module 116, protected audio visual path 120, memory 112, display 122, or a server such as server 104.

The memory 112 may be a memory operable to store data received from the camera 110. The memory 112 may be prevented from saving unencrypted data produced by the camera 110 such as by altering the path of data produced by the camera 110. In some embodiments, memory 112 may be an image processing module memory for an image processing module such as image processing module 114. Such a memory may be configured to prevent devices and applications from accessing data in the memory. In some embodiments, an isolated memory region protocol may protect memory such as a memory of an image processing module. In such embodiments the device 102 may be a system-on-a chip (SoC) device, such as an Intel® Atom™ SoC available from Intel Corporation of Santa Clara, Calif. in other embodiments where device 102 is running on a core-based platform, the memory may be protected by a restricted address range protocol. The restricted address range may be set by pre-BIOS (basic input output system) secure firmware. Data may be protected by a secure memory (e.g. a memory with an isolated memory region or a restricted address range) by preventing unauthorized applications or devices from accessing the data.

Image processing module 114 may be operable to convert raw camera data into encoded data such as encoded image data or encoded video data such as a JPEG (Joint Photographic Experts Group) or an MPEG (Moving Picture Experts Group) encoding. The encoded data may be compatible with a display such as display 122 so as to allow the display to present the encoded data as an image or a video. The encoded data may be prevented from being saved to a memory of a device or protected from being accessed by unauthorized devices or applications such as by implementing an isolated memory region or a restricted address range protocol.

Encryption module 116 may be operable to receive data such as image data, encoded data, or augmented data and produce an encrypted version of the data. In some embodiments, the camera 110 may produce raw data that is sent to the encryption module 116 to be encrypted. In some embodiments, the encrypted data may be saved to a local memory such as memory 112 in instances where the decryption key is known by the hardware associated with the camera such as hardware of device 102. In some embodiments, the encrypted data may be saved to a server such as server 104 in instances where the decryption key is known by the server. In some embodiments, the decryption key is known only by the memory or the server, such that only the memory or the server, respectively, can decrypt the encrypted data. In some embodiments, encryption module 116 may be operable to perform a decryption function on data it receives.

Location sensor 118 may be operable to determine approximately where the device 102 is located at a given time. In some embodiments, location sensor 118 is coupled to a GPS application to help determine the approximate location of the location sensor 118 at a given time. In some embodiments, location sensor 118 is coupled to a Wi-Fi application to help determine the approximate location of the location sensor 118 at a given time. The approximate location may be used to determine if the location sensor, and thus the device or the camera, is in a secure area (e.g. protected area). Secure areas may be pre-defined in a computer readable log. The secure area log may be defined by an information technology (IT) administrator or other authorized personnel. In some embodiments, when it is determined that the device is in a secure area the trusted execution environment may put the camera into a secure mode.

A PAVP 120 may be configured to encrypt data it receives. The PAVP may be configured to share the decryption key with only the display device or its associated hardware such that only the display device such as display 122 or its associated hardware may decrypt the data and display the content. In some embodiments, the PAVP 120 may be configured to receive data from an augmented reality application server such as server 104. In some embodiments, the PAVP 120 may be configured to receive data from a secure memory such as memory 112.

Display 122 may be a screen capable of displaying images or videos. In some embodiments, the display may comprise associated hardware operable to decrypt data received at the input of the display. The data received at the input may be from a PAVP such as protected audio visual path 120 or from an image processing module such as image processing module 114 such as when the camera is not in the secure mode or the preview mode.

A TEE 124 may be operable to encrypt encoded image data from the image processing module 114. In some embodiments, TEE may comprise Chaabi firmware, management engine (ME) firmware, or other TEE firmware. The TEE 124 may transmit an encrypted image to a server such as server 104. In some embodiments, server 104 may comprise a cloud server. In some embodiments, the encryption module 116 may be used to encrypt data when the camera 110 is placed in preview mode and the TEE 124 may be used when the camera is placed in secure mode.

The server 104 may run AR related algorithms (feature extraction, matching features with the database) to recognize the equipment. In some embodiments, the server 104 may also recognize the orientation of the equipment. The feature extraction or matching features with the database algorithms may include checking a received image against approved patterns, configurations, or images in a database. In some embodiments, only approved patterns, configurations, or images may be transmitted from the cloud server to the camera. If the image does not include an approved pattern or configuration of objects in the image then the server 104 may not transmit the image back to the device to be displayed. In some embodiments, the cloud server may transmit approved images back to the device. For example, the cloud server may transmit approved images to a PAVP of a device. In some embodiments, the cloud server may re-direct the image data it receives to an augmented reality application server. In some embodiments, a device may be allowed to save images captured by a camera associated with a device such as camera 110 associated with device 102 in a cloud server when the device is in the secure mode.

Server 104 may comprise an augmented reality application server. An augmented reality application server may be operable to augment or alter images it receives and transmit either the augmented or altered image or the original image and augmentation data representative of the augmentation or alteration to be done to the original image. In some embodiments, the augmented reality application server transmits data to a PAVP of a device. In some embodiments, when the location sensor indicates to the TEE that the device is not in the secure area, the augmented reality application may be terminated. That is, in some embodiments, an augmented reality application is only allowed to function when a device comprising a camera is located near a designated secure area.

Server 104 may be configured as a mobile device management (MDM) server. An MDM server may be operable to store a policy related to device operation such as device 102 within a specific area. For example, a policy related to a Smartphone may include data indicating that the Smartphone is capable of being placed in a secure mode or a preview mode. In some embodiments, a TEE such as trusted execution environment 124 may be in communication with an MDM server such as server 104 and an image processing module such as image processing module 114. When a camera such as camera 110 is turned on the image processing module may indicate this to the TEE which may indicate that the camera is turned on to the server. A location sensor such as location sensor 118 may transmit location data to the server. The server may then use the location data to determine the camera policy to be implemented. When the camera is located in a secure area the camera may be placed in secure camera mode, turned off, allowed to remain in normal operation or placed in a preview mode.

Server 104 may be configured as a cloud server configured to redirect encrypted encoded data to the augmented reality server. In some embodiments, the server may first use a feature extraction algorithm or match features in the image with approved patterns, configurations, or images before redirecting the encrypted encoded data to the augmented reality server.

In some embodiments, a device comprising a camera such as device 102 may be operable to be placed in a preview mode. When a device is placed in preview mode, the camera may send image or video data to an image processing module which may encode the image or video data to create encoded data. The encoded data may be sent to a MVP which may send an encrypted version of the encoded data to the display device or its associated hardware. In this way the camera may be tested to see if the lighting conditions are sufficient for using the camera or to see if the camera is otherwise working properly.

Thus, in some embodiments image/video data captured in a protected area may be captured by a camera such as camera 110. The image/video data may be encoded or encrypted using an image processing module such as image processing module 114 or a trusted execution environment (TEE) such as trusted execution environment 124. The encrypted data may be sent to a server such as server 104. The image processing module may save encoded (but clear text data) in an isolated memory region (IMR). A TEE or an encryption module such as encryption module 116 may encrypt the encoded data and put it in the system memory. An augmented reality (AR) application running on a device such as device 102 may send encrypted image/video data to the server using a network such as network 108. The server may decrypt the encrypted image/video data, run AR related algorithms (e.g. feature extraction, matching features with the database) to recognize the equipment or its orientation. The AR related algorithms may overlay the image/video data with augmented information, encrypt the image/video data and augmented information and send it to the device (e.g. Smartphone including a camera). The AR application on the camera may receive the encrypted augmented image/video data from a network connected to the device and the server. The camera may save the encrypted augmented image/video data in the system memory and indicate to a protected audio visual path (PAVP) such as protected audio visual path 120 that the data is to be rendered. PAVP hardware may read the data, decrypt it, and render the augmented image/video on a display such as display 122.

Figure 2:
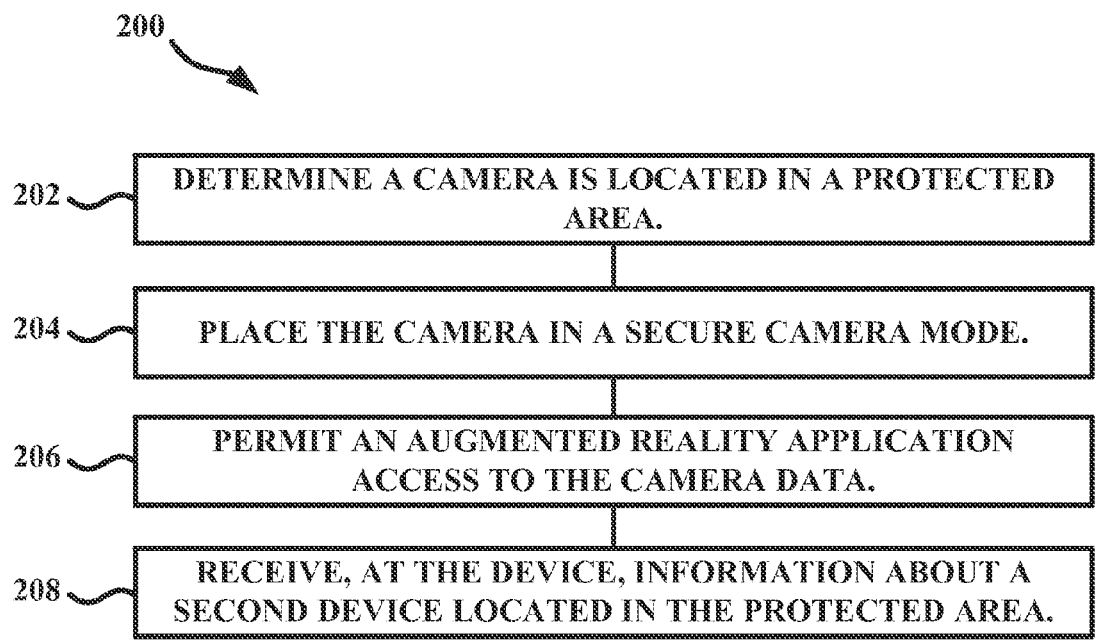
FIG. 2 is a flow diagram of a method, according to an example embodiment.

FIG. 2 is a flow diagram of a method 200, according to an example embodiment. The method 200 is an example of a method that may be performed as part of a process to place a camera in secure mode based on a location of the camera. The method 200 includes determining a camera, such as camera 110 of FIG. 1, is located in a protected area 202. In some embodiments, determining if the camera is in the protected area includes determining if a Smartphone including a camera such as device 102 is in the protected area. At or around the time the camera is located in the protected area the camera may be placed in a secure camera mode and data produced by the camera may be protected 204.

In some embodiments, data produced by the camera may be protected by preventing the camera from storing data to a memory in the clear (e.g. preventing the camera from storing unencrypted data), such as memory 112 of FIG. 1, local to a device that includes the camera while the camera is in the protected area. In some embodiments, when the camera is in the protected area (e.g. when the camera is in the secure camera mode), data produced by the camera may be encrypted, such as by encryption module 116 or trusted execution environment 124 of FIG. 1, before it may be saved locally or to a server. In some embodiments, data produced by the camera may also, or alternatively, be protected by sending the data to a PAVP such as protected audio visual path 120.

In some embodiments, an augmented reality application server, such as server 104 of FIG. 1, may be permitted access to the data produced by the camera when the camera is in the secure camera mode 206. In some embodiments, the camera such as device 102 may receive information about a second device such as manufacturing equipment located in the protected area 208. The information about the second device may be overlaid on an image of the second device that was transmitted from the camera.

Figure 3:
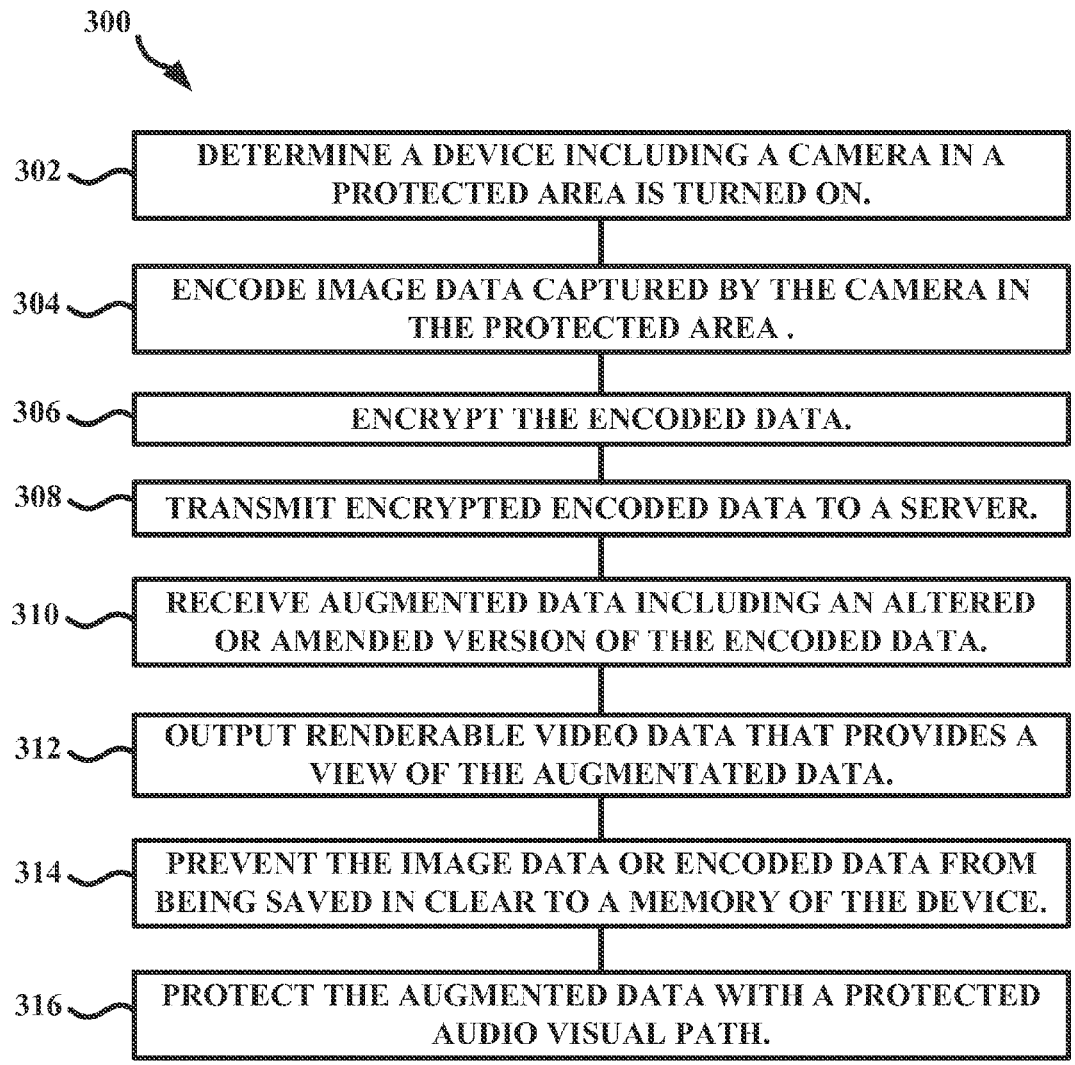
FIG. 3 is a flow diagram of a method, according to an example embodiment.

FIG. 3 is a flow diagram of a method 300 according to an example embodiment. The method 300 is an example of a method that may be performed with regard to a camera in view of defined protected areas. The method 300 includes determining a device, such as device 102 including a camera, is located in a protected area 302. Determining the device is in a protected area may include determining the location of the device with a location sensor such as GPS. The location may also be determined in other ways, such as by a connection to a known WiFi network, a presence of another radio frequency signal including encoded data, among other location determination processes and mechanisms. When in a protected area, a determination may be made of whether a camera of the device is turned on. Such a determination of whether the camera is turned on may be accomplished with an image processing module in communication with a TEE, such as the image processing module 114 in communication with the trusted execution environment 124, both of FIG. 1. Data captured by the camera in the protected area may be encoded 304. An image processing module such as image processing module 114 may encode the data so as to make the data compatible with a display such as display 122.

The encoded data may then be encrypted 306 to create encrypted encoded data. Encryption may be accomplished with an encryption module, such as encryption module 116 or a TEE such as trusted execution environment 124 of FIG. 1. Encrypted encoded data may be transmitted 308 to a server such as server 104. In some embodiments, the data may be transmitted to the server from the device through a network to which both the device and the server are connected. Augmented data including an altered or amended version of the encoded data may be received 310 in response to the transmission 308. The augmented data may be created with an augmented reality server such as server 104. The altered or amended version of the encoded data may include encoded data altered or amended with augmentation data. Renderable video data that provides a view of the augmented data may be output 312. The video data may be output to a display device such as display 122.

In some embodiments, the method 300 may include preventing image data (e.g. clear text image data) from being saved to a memory such as memory 112 of the device 314. Preventing image data from being saved in the clear to a memory may include altering the data path of data produced by the device. As used herein, "in the clear" means saved to an unprotected memory such as system memory and not encrypted. In some contexts in the clear is synonymous with cleartext, however no actual text is required for data to be saved in the clear. Data may be prevented from being saved in the clear independent of data type such as text or image data. Thus, as used herein, preventing image data from being saved in the clear may include saving the data to a secure memory or encrypting the data before saving the data to a non-secure memory. Protecting the image data from unauthorized applications or devices may include implementing an isolated memory region or a restricted access range. In some embodiments, augmented data or encoded data may be sent to a protected audio visual path to protect the augmented data or encoded data 316.

In some embodiments, the encoded data may be received at a server such as server 104. In some embodiments, the encoded data may be encrypted encoded data that is decrypted by the server to recreate the encoded data. In some embodiments, the server may be an augmented reality application server. In some embodiments, the server may augment the encoded data to create augmented data such as by altering or amending the encoded data. In some embodiments, the augmented data may be sent to a device such as device 102.

Figure 4:
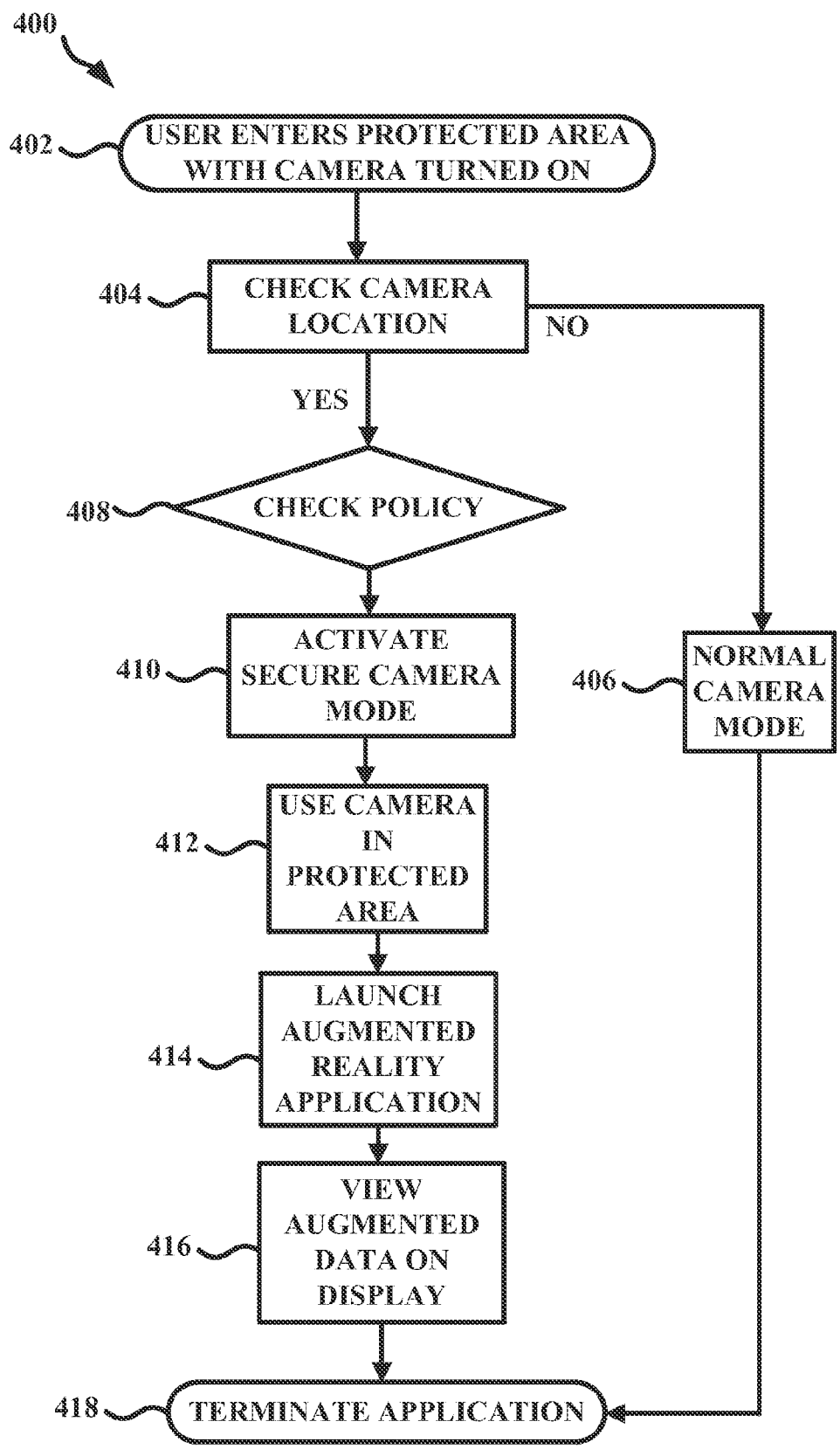
FIG. 4 is a flow diagram of an image processing application, according to an example embodiment.

FIG. 4. is a flow diagram depiction of an image processing application flow 400, according to an example embodiment. The image processing application may be implemented by a device such as device 102. The flow may begin with a user entering a protected area with a camera turned on 402. In some embodiments, the user may turn the camera on while near the protected area. A camera location may be checked 404. The camera location may indicate that either the camera is near a protected area (YES) or is not near a protected area (NO). If the camera is not near a protected area the camera may be used in normal mode 406. If the camera is near a protected area a policy such as the secure location policy for the camera may be checked 408. The policy may indicate that the camera is capable of being placed in a secure mode 410 or a preview mode. The camera policy may be invoked and the camera may be placed in a secure mode. The camera may be used in the secure mode in the protected area 412 such as to troubleshoot a problem with a device in the protected area. An augmented reality application may be launched 414. An augmented reality technician may be available to overlay, using a computer, the encoded data with augmented data. The augmented data may be saved to a server such as server 104 for future use. The augmented data created by the augmented reality application may be viewed 416. After the user is done with the augmented reality application or is done using the camera the application may terminate.

FIG. 5 is a block diagram of a computer system to implement methods according to an example embodiment. In the embodiment shown in FIG. 5, a hardware and operating environment is provided that is applicable to any of the servers and/or remote clients shown in the other Figures.

As shown in FIG. 5, one embodiment of the hardware and operating environment includes a general purpose computing device in the form of a computer 500 (e.g., a personal computer, workstation, or server), including one or more processing units 521, a system memory 522, and a system bus 523 that operatively couples various system components including the system memory 522 to the processing unit 521. There may be only one or there may be more than one processing unit 521, such that the processor of computer 500 comprises a single central-processing unit (CPU), or a plurality of processing units, commonly referred to as a multiprocessor or parallel-processor environment. In various embodiments, computer 500 is a conventional computer, a distributed computer, or any other type of computer.

The system bus 523 can be any of several types of bus structures including a memory bus or memory controller, a peripheral bus, and a local bus using any of a variety of bus architectures. The system memory can also be referred to as simply the memory, and, in some embodiments, includes read-only memory (ROM) 524 and random-access memory (RAM) 525. A basic input/output system (BIOS) program 526, containing the basic routines that help to transfer information between elements within the computer 500, such as during start-up, may be stored in ROM 524. The computer 500 further includes a hard disk drive 527 for reading from and writing to a hard disk, not shown, a magnetic disk drive 528 for reading from or writing to a removable magnetic disk 529, and an optical disk drive 530 for reading from or writing to a removable optical disk 531 such as a CD ROM or other optical media.

The hard disk drive 527, magnetic disk drive 528, and optical disk drive 530 couple with a hard disk drive interface 532, a magnetic disk drive interface 533, and an optical disk drive interface 534, respectively. The drives and their associated computer-readable media provide non volatile storage of computer-readable instructions, data structures, program modules and other data for the computer 500. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 529, optical disk 531, ROM 524, or RAM 525, including an operating system 535, one or more application programs 536, other program modules 537, and program data 538. Programming for implementing one or more processes or method described herein may be resident on any one or number of these computer-readable media.

A user may enter commands and information into computer 500 through input devices such as a keyboard 540 and pointing device 542. Other input devices (not shown) can include a microphone, joystick, game pad, satellite dish, scanner, or the like. These other input devices are often connected to the processing unit 521 through a serial port interface 546 that is coupled to the system bus 523, but can be connected by other interfaces, such as a parallel port, game port, or a universal serial bus (USB). A monitor 547 or other type of display device can also be connected to the system bus 523 via an interface, such as a video adapter 548. The monitor 547 can display a graphical user interface for the user. In addition to the monitor 547, computers typically include other peripheral output devices (not shown), such as speakers and printers.

The computer 500 may operate in a networked environment using logical connections to one or more remote computers or servers, such as remote computer 549. These logical connections are achieved by a communication device coupled to or a part of the computer 500; the invention is not limited to a particular type of communications device. The remote computer 549 can be another computer, a server, a router, a network PC, a client, a peer device or other common network node, and typically includes many or all of the elements described above I/O relative to the computer 500, although only a memory storage device 550 has been illustrated. The logical connections depicted in FIG. 5 include a local area network (LAN) 551 and/or a wide area network (WAN) 552. Such networking environments are commonplace in office networks, enterprise-wide computer networks, intranets and the internet, which are all types of networks.

When used in a LAN-networking environment, the computer 500 is connected to the LAN 551 through a network interface or adapter 553, which is one type of communications device. In some embodiments, when used in a WAN-networking environment, the computer 500 typically includes a modem 554 (another type of communications device) or any other type of communications device, e.g., a wireless transceiver, for establishing communications over the wide-area network 552, such as the internet. The modem 554, which may be internal or external, is connected to the system bus 523 via the serial port interface 546. In a networked environment, program modules depicted relative to the computer 500 can be stored in the remote memory storage device 550 of remote computer, or server 549. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Additional Notes and Examples

In Example 1, a method comprises determining a camera is located in a protected area, and when the camera is located in the protected area, placing the camera in a secure camera mode protecting data produced by the camera.

In Example 2, the determining if the camera is in the protected area of Example 1 includes determining a Smartphone that includes the camera is in the protected area.

In Example 3, the protecting data produced by the camera of at least one of Examples 1-2 includes preventing the camera from storing data in the clear to a memory local to a first device that includes the camera while the camera is in the protected area.

In Example 4, the protecting data produced by the camera of at least one of Examples 1-3 includes encrypting data before the data is saved locally while the camera is in the secure camera mode.

In Example 5, the method of at least one of Examples 1-4 comprises permitting an augmented reality application server access to the data produced by the camera when the camera is in the secure camera mode.

In Example 6, the method of at least one of Examples 1-5 comprises receiving, at the device, information about a second device located in the protected area overlaid on an image of the second device transmitted by the device.

In Example 7, the protecting data produced by the camera of at least one of Examples 1-6 includes sending the data produced by the camera to a protected audio visual path.

In Example 8, a method comprises determining a device including a camera in a protected area is turned on.

In Example 9, the method of at least one of Examples 1-8 includes determining the camera is turned on.

In Example 10, the method of at least one of Examples 1-9 includes encoding image data captured by the camera in the protected area with an image processing module to create encoded data.

In Example 11, the method of at least one of Examples 1-10 includes encrypting the encoded data to create encrypted encoded data.

In Example 12, the method of at least one of Examples 1-11 includes transmitting, from the device, the encrypted encoded data to a server, the device and the server connected to a network.

In Example 13, the method of at least one of Examples 1-12 includes receiving, at the device, encoded data altered or amended with augmentation data.

In Example 14, the method of at least one of Examples 1-13 includes outputting renderable video data that provides a view of the encoded data altered or amended with augmentation data including the encoded data overlaid with augmentation data when presented with a display device.

In Example 15, the method of at least one of Examples 1-14 includes preventing the image data from being saved in the clear to a memory of the device.

In Example 16, the method of at least one of Examples 1-15 includes receiving, at a server, the encoded data.

In Example 17, the method of at least one of Examples 1-16 includes augmenting the encoded data to create the augmented version of the encoded data.

In Example 18, the method of at least one of Examples 1-17 includes sending the augmented version of the encoded data to the device.

In Example 19, the method of at least one of Examples 1-18 includes protecting the augmented data with a protected audio visual path (PAVP).

In Example 20, the determining if a camera is in a protected area of at least one of Examples 1-19 includes determining the location of the device with a location sensor.

In Example 21, the displaying the augmented version of the encoded data of at least one of Examples 1-20 includes displaying information about a machine in the protected area overlaid on an image of the machine.

In Example 22, the method of at least one of Examples 1-21 includes determining the device is in the protected area.

In Example 23, the determining the device is in the protected area of at least one of Examples 1-22 includes determining the location of the device with a location sensor.

In Example 24, the method of at least one of Examples 1-23 includes determining the device includes a camera.

In Example 25, a system comprises a first device including a camera, the camera including a secure mode of operation and a display.

In Example 26, the system of at least one of Examples 1-25 includes an image processing module configured to convert image data from the camera to encoded data when the camera is in the secure mode and protect image data stored in the system.

In Example 27, the system of at least one of Examples 1-26 includes an encryption module configured to encrypt encoded data from the image processing module.

In Example 28, the system of at least one of Examples 1-27 includes a protected audiovisual path mechanism configured to securely send augmented encoded data to the display.

In Example 29, the image processing module of at least one of Examples 11-28 includes a secure memory configured to protect the image data by preventing unauthorized applications and devices from accessing data stored in the secure memory.

In Example 30, the first device of at least one of Examples 1-29 is configured to transmit the encrypted encoded data.

In Example 31, the system of at least one of Examples 1-30 includes an augmented reality server configured to decrypt the encrypted encoded data and augment the encoded data to create the augmented encoded data.

In Example 32, the system of at least one of Examples 1-31 includes a cloud server configured to redirect encrypted encoded data to the augmented reality server.

In Example 33, the protected audiovisual path mechanism of at least one of Examples 1-32 is configured to encrypt the augmented data such that only the display can decrypt the augmented data.

In Example 34, the first device of at leas one of Examples 1-33 includes a location sensor.

In Example 35, the camera of at least one of Examples 1-34 is placed in the secure mode of operation when the location sensor indicates the device is in a protected area and the camera is turned on.

In Example 36, the camera of at least one of Examples 1-35 includes a preview mode.

In Example 37, when the camera of at least one of Examples 1-36 is in the preview mode, data from the camera is sent to the image processing module and the processing module encrypts the data such that only hardware associated with the display can decrypt the encrypted data.

In Example 38, a machine readable storage device that stores instructions, the instructions, which when performed by a machine, cause the machine to perform operations, the operations comprising, determining a device including a camera in a protected area is turned on.

In Example 39, the machine readable storage device of at least one of Examples 1-38 stores instructions, which when performed by a machine, cause the machine to perform operations, the operations comprising, determining a device including a camera in a protected area is turned on.

In Example 40, the machine readable storage device of at least one of Examples 1-39 stores instructions, which when performed by a machine, cause the machine to perform operations, the operations comprising, encoding image data captured by the camera in the protected area with an image processing module to create encoded data.

In Example 41, the machine readable storage device of at least one of Examples 1-40 stores instructions, which when performed by a machine, cause the machine to perform operations, the operations comprising, encrypting the encoded data to create encrypted encoded data.

In Example 42, the machine readable storage device of at least one of Examples 1-41 stores instructions, which when performed by a machine, cause the machine to perform operations, the operations comprising, transmitting, from the device, the encrypted encoded data to a server, the device and the server connected to a network.

In Example 43, the machine readable storage device of at least one of Examples 1-42 stores instructions, which when performed by a machine, cause the machine to perform operations, the operations comprising, receiving, at the device, augmented data including an altered or amended version of the encoded data altered or amended with augmentation data.

In Example 44, the machine readable storage device of at least one of Examples 1-43 stores instructions, which when performed by a machine, cause the machine to perform operations, the operations comprising, outputting renderable video data that provides a view of the augmented data including the encoded data overlaid with augmentation data when presented with a display device.

In Example 45, the machine readable storage device of at least one of Examples 1-44 stores instructions, which when performed by a machine, cause the machine to perform operations, the operations comprising, preventing the image data or encoded data from being saved in the clear to a memory of the device.

In Example 46, the machine readable storage device of at least one of Examples 1-45 stores instructions, which when performed by a machine, cause the machine to perform operations, the operations comprising, determining the device includes a camera.

In Example 47, the machine readable storage device of at least one of Examples 1-46 stores instructions, which when performed by a machine, cause the machine to perform operations, the operations comprising, sending the augmented data or encoded data to a protected audio visual path (PAVP) to protect the augmented data.

In Example 48, the machine readable storage device of at least one of Examples 1-47 stores instructions, which when performed by a machine, cause the machine to perform operations, the operations comprising, determining the device is in the protected area.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

The above description is intended to be illustrative, and not restrictive. For example, the above-described examples (or one or more aspects thereof) may be used in combination with each other. Other embodiments can be used such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the inventive subject matter should be determined with reference to the appended claims, along with the full scope of equivalents to which such claims are entitled.

What is claimed is:

1. A method comprising:
   determining a camera is located in a protected area;
   when the camera is located in the protected area, placing the camera in a secure camera mode and protecting data produced by the camera; and
   permitting an augmented reality application server access to the data produced by the camera when the camera is in the secure camera mode.

2. The method of claim 1, wherein protecting data produced by the camera includes preventing the camera from storing data in the clear to a memory local to a first device that includes the camera while the camera is in the protected area.

3. The method of claim 1, wherein determining the camera is in the protected area includes determining a Smartphone that includes the camera is in the protected area.

4. The method of claim 1, wherein protecting data produced by the camera includes encrypting data before the data is saved locally while the camera is in the secure camera mode.

5. The method of claim 1, further comprising:
   receiving, at a device including the camera, information about a second device located in the protected area overlaid on an image of the second device transmitted by the device.

6. The method of claim 1, wherein protecting data produced by the camera includes sending the data to a protected audio visual path of the camera.

7. A method comprising:
   determining a device including a camera in a protected area is turned on;
   encoding image data captured by the camera in the protected area with an image processing module to create encoded data;
   receiving, at a server, the encoded data;
   encrypting the encoded data to create encrypted encoded data;
   transmitting, from the device, the encrypted encoded data to a server, the device and the server connected to a network;
   augmenting the encoded data to create augmented data;
   transmitting the augmented data to the device;
   receiving, at the device, the augmented data including an altered or amended version of the encoded data altered or amended with augmentation data; and
   outputting renderable video data that provides a view of the augmented data including the encoded data overlaid with augmentation data when presented with a display device.

8. The method of claim 7, further comprising:
   preventing the image data or encoded data from being saved in the clear to a memory of the device.

9. The method of claim 7, further comprising:
   saving the augmented data at the server.

10. The method of claim 7, further comprising:
    sending the augmented data or encoded data to a protected audio visual path (PAVP) to protect the augmented data.

11. The method of claim 7, further comprising:
    determining the device is in the protected area.

12. The method of claim 11, wherein determining the device is in the protected area includes determining the location of the device with a location sensor.

13. The method of claim 7, further comprising:
    determining the device includes a camera.

14. The method of claim 7, wherein displaying the augmented version includes displaying information about a machine in the protected area overlaid on an image of the machine.

15. A system comprising:
    a first device including a camera, the camera including a secure mode of operation and a display;
    an image processing module configured to convert image data from the camera to encoded data when the camera is in the secure mode and protect image data stored in the system, wherein the image processing module includes a secure memory configured to protect the image data by preventing unauthorized applications and devices from accessing data stored in the secure memory;
    an encryption module configured to encrypt encoded data from the image processing module; and
    a protected audiovisual path mechanism configured to securely transmit augmented encoded data to the display.

16. The system of claim 15, wherein the device is configured to transmit the encrypted encoded data, the system further comprising:
    an augmented reality server configured to decrypt the encrypted encoded data and augment the encoded data to create the augmented encoded data.

17. The system of claim 16, further comprising:
    a cloud server configured to redirect encrypted encoded data to the augmented reality server.

18. The system of claim 15, wherein the protected audiovisual path mechanism encrypts the augmented data such that only the display can decrypt the augmented data.

19. The system of claim 15, wherein:
    the first device includes a location sensor; and
    the camera is placed in the secure mode of operation when the location sensor indicates the device is in a protected area and the camera is turned on.

20. The system of claim 15, wherein:
    the camera includes a preview mode; and
    when the camera is in the preview mode, data from the camera is sent to the image processing module and the image processing module encrypts the data such that only hardware associated with the display can decrypt the encrypted data.

21. A machine readable storage device that stores instructions, the instructions, which when performed by a machine, cause the machine to perform operations comprising:
    determining a device including a camera in a protected area is turned on;
    placing the device in a secure camera mode;
    permitting an augmented reality application server access to the data produced by the camera when the camera is in the secure camera mode;
    encoding image data captured by the camera in the protected area with an image processing module to create encoded data;
    encrypting the encoded data to create encrypted encoded data;

transmitting, from the device, the encrypted encoded data to a server, the device and the server connected to a network;

receiving, at the device, augmented data including an altered or amended version of the encoded data altered or amended with augmentation data; and outputting renderable video data that provides a view of the augmented data including the encoded data overlaid with augmentation data when presented with a display device.

22. The machine readable storage device of claim 21, wherein the instructions for halting the computer system include instructions which when performed by the machine, cause the machine to perform operations comprising:

preventing the image data or encoded data from being saved in the clear to a memory of the device.

23. The machine readable storage device of claim 21, wherein the instructions for halting the computer system include instructions which when performed by the machine, cause the machine to perform operations comprising:

determining the device includes a camera.

24. The machine readable storage device of claim 21, wherein the instructions for halting the computer system include instructions which when performed by the machine, cause the machine to perform operations comprising:

sending the augmented data or encoded data to a protected audio visual path (PAVP) to protect the augmented data.

25. The machine readable storage device of claim 21, wherein the instructions for halting the computer system include instructions which when performed by the machine, cause the machine to perform operations comprising:

determining the device is in the protected area.

\* \* \* \* \*